(12) United States Patent
McAlister

(10) Patent No.: US 6,984,305 B2
(45) Date of Patent: Jan. 10, 2006

(54) METHOD AND APPARATUS FOR SUSTAINABLE ENERGY AND MATERIALS

(76) Inventor: Roy E. McAlister, 1739 W. 7th Ave., Mesa, AZ (US) 85202-1906

( * ) Notice: Subject to any disclaimer, the term of this patent is extended or adjusted under 35 U.S.C. 154(b) by 414 days.

(21) Appl. No.: 09/969,860

(22) Filed: Oct. 1, 2001

(65) Prior Publication Data
US 2003/0062270 A1 Apr. 3, 2003

(51) Int. Cl.
C02F 3/28 (2006.01)

(52) U.S. Cl. ............... 205/637; 205/688; 205/698; 210/603; 210/612; 210/613

(58) Field of Classification Search .............. 205/637, 205/688, 698; 210/603, 612, 613, 605; 322/2 R
See application file for complete search history.

(56) References Cited

U.S. PATENT DOCUMENTS

| 5,254,934 | A | * | 10/1993 | Carabetta et al. ........... 322/2 R |
| 6,090,266 | A | * | 7/2000 | Roychowdhury ........... 205/637 |
| 6,299,774 | B1 | * | 10/2001 | Ainsworth et al. ......... 210/603 |

\* cited by examiner

Primary Examiner—Arun S. Phasge

(57) ABSTRACT

A process for the production of hydrogen from anaerobically decomposed organic materials by applying an electric potential to the anaerobically decomposed organic materials, including landfill materials and sewage, to form hydrogen, and for decreasing the time required to treat these anaerobically decomposed organic materials. The organic materials decompose to volatile acids such as acetic acid, which may be hydrolyzed by electric current to form hydrogen. The process may be continuously run in sewage digestion tanks with the continuous feed of sewage, at landfill sites, or at any site having a supply of anaerobically decomposed or decomposable organic materials.

14 Claims, 4 Drawing Sheets

METHOD AND APPARATUS FOR SUSTAINABLE ENERGY AND MATERIALS

BACKGROUND OF THE INVENTION

Improved use of renewable resources is essential to maintain the progress that has been achieved by the Industrial Revolution that now depends upon annually burning fossil resources that took more than one million years to accumulate. The present invention provides novel ways to produce and utilize methane, carbon dioxide, fixed nitrogen, trace minerals, carbon, and hydrogen derived from renewable resources.

1. Field of the Invention

This invention relates to a process for producing renewable energy and substances and to improve the quality of fluids such as hydrogen and methane derived from organic materials, particularly including materials such as those found in landfill materials, waste water, sewage sludge, and agricultural wastes.

2. Description of Related Art

More than 400 hundred million cattle, swine, and poultry produce over two billion tons of manure each year. If collected in one place this would cover an area of 1,000 square miles to a depth of two feet. In most instances the compounds of manure that are largely comprised of carbon, hydrogen, and nitrogen are allowed to rot into the environment. Aerobic decay releases greenhouse gases including carbon dioxide and water. Anaerobic decay releases more harmful greenhouse gases such as ammonia, methane, and water.

Problematic pollution of groundwater and the oceans is caused by allowing manure to enter waterways. Sewage solids and garbage wastes are frequently impounded in landfills. Fixed ammonia and trace minerals essential to soil nutrition are thus kept for hundreds of years, if not longer, from being returned to the soil to produce more healthful crops. Minimal substitution of fertilizers produced from fossil resources provide increased yields but the nutritional content remains questionable.

Established processes for producing commercially significant amounts of methane include anaerobic digestion of biomass to release methane and carbon dioxide. Hydrogen is produced by: (1) steam reforming of hydrocarbons, (2) partial oxidation of coal and other hydrocarbons, and (3) by anaerobic pyrolysis.

U.S. central power plants produce more carbon dioxide than any other source. Electricity is generated by plants that burn fossil fuels such as coal, natural gas, and oil. Nuclear power plants depend upon very large expenditures of fossil fuels to produce the steel and other alloys of construction, concrete ingredients, to mine, refine, form, package, and deliver nuclear fuels and to process, transport and store nuclear wastes. Steam-reformation and partial oxidation of hydrocarbons present difficulties because of the production of carbon dioxide and general dependence upon depletable fossil hydrocarbon resources.

Previous investigators including Michael R. St. John (U.S. Pat. Nos. 4,395,316 and 4,341,608), Donald L. Day (U.S. Pat. No. 4,200,505), Mr. Darnell (U.S. Pat. No. 4,105,755), Ronald J. Vaughan (U.S. Pat. No. 4,389,288), James L. Ramer (U.S. Pat. No. 4,124,481) and S. Roychowdhury (patent application Ser. No. 08/659,644) provide carbon dioxide and other unwanted gases that dilute the fuel produced and fail completely to sequester carbon.

Use of biomass digester gas generally consisting of 30 to 70% methane and the balance carbon dioxide, hydrogen sulfide, and water vapor as an engine fuel requires derating of the power capacity of the engine. Even where hydrogen is produced, engine and fuel cell life may be significantly shortened due to the severely corrosive nature of fuels that contain hydrogen sulfide and water vapor.

It is therefore difficult and/or uneconomical for most energy conversion applications to use digester gas. Expensive state of the art processes to remove the carbon dioxide, hydrogen sulfide, and water vapor has kept the promise of renewable methane and hydrogen from significantly improving living standards for the world's energy hungry population.

OBJECTS OF THE INVENTION

It is an object of the invention to overcome the difficulties and shortcomings of the above noted circumstances and prior art.

It is an object of the invention to remove particulates, carbon dioxide, hydrogen sulfide, and water vapor from a mixtures of such fluids with methane.

It is an object of the invention to remove particulates, carbon dioxide, hydrogen sulfide, and water vapor from a mixtures of such fluids with hydrogen.

It is an object of this invention to provide a method of methane production that does not require the depletive use of fossil substances.

It is an object of this invention to provide a method of carbon production that does not require the use of fossil substances.

It is an object of the invention to provide a method for capturing carbon dioxide and sequestering useful carbon.

It is an object of this invention to provide a method of hydrogen production that does not require the use of fossil substances.

It is an object of this invention to provide a method of soil nutrient production which does not require the use of fossil substances.

It is an object of the invention to serve communities that have relatively undeveloped electricity distribution and other energy infrastructures with a system that provides useful energy from collected wastes.

It is an object of the present invention to separate carbon dioxide, nitrogen and other gases from mixtures with hydrogen.

It is an object of the present invention to separate carbon dioxide, nitrogen and other gases from mixtures with methane.

It is an object of the present invention to separate carbon, hydrogen and soil nutrients from biomass wastes.

SUMMARY OF THE INVENTION

This invention relates generally to combination of processes that produce and deliver substances of value including carbon, methane and/or hydrogen, and various chemicals from anaerobically decomposed organic materials such as cellulosic materials and anaerobically digested sewage sludge. More specifically, the invention relates to embodiments wherein relatively high value fuel and other fluids are made from low value organic materials.

DETAILED DESCRIPTION OF THE INVENTION

The process of the present invention may typically be practiced at any large municipal landfill or sewage treatment facility along with smaller systems for decomposing organics such as sewage, garbage, and farm wastes.

Such landfill materials and sewage contain methane-producing microorganism species and hydrogen-producing bacterial species. Typically, anaerobic decay of sewage sludge produces gaseous mixtures of 50 to 70% methane and 30 to 50% carbon dioxide on a dry analysis basis. In many applications, it is preferred to utilize a heat engine such as a gas turbine or piston engine and generator in which the engine is fueled with a "SparkInjector" or "SmarterPlug" combination fuel injector and ignition system to facilitate extremely robust operation.

SmarterPlug operation as disclosed in U.S. Pat. Nos. 5,394,852; 5,343,699 along with hybrid heat engine and fuel cell combinations in U.S. application Ser. No. 09/128,673 are incorporated herein as part of this disclosure. This enables the raw mixture of methane and/or hydrogen and carbon dioxide to be used as a very low grade fuel without further conditioning while producing very high thermal efficiency and full rated power in comparison with engine operation on homogeneous charge gasoline or natural gas. This is a particularly important advantage for remote operation and to bring fuel and power to depressed economies where it is prohibitive to import and/or transport fossil-based fuels.

Figure 1:
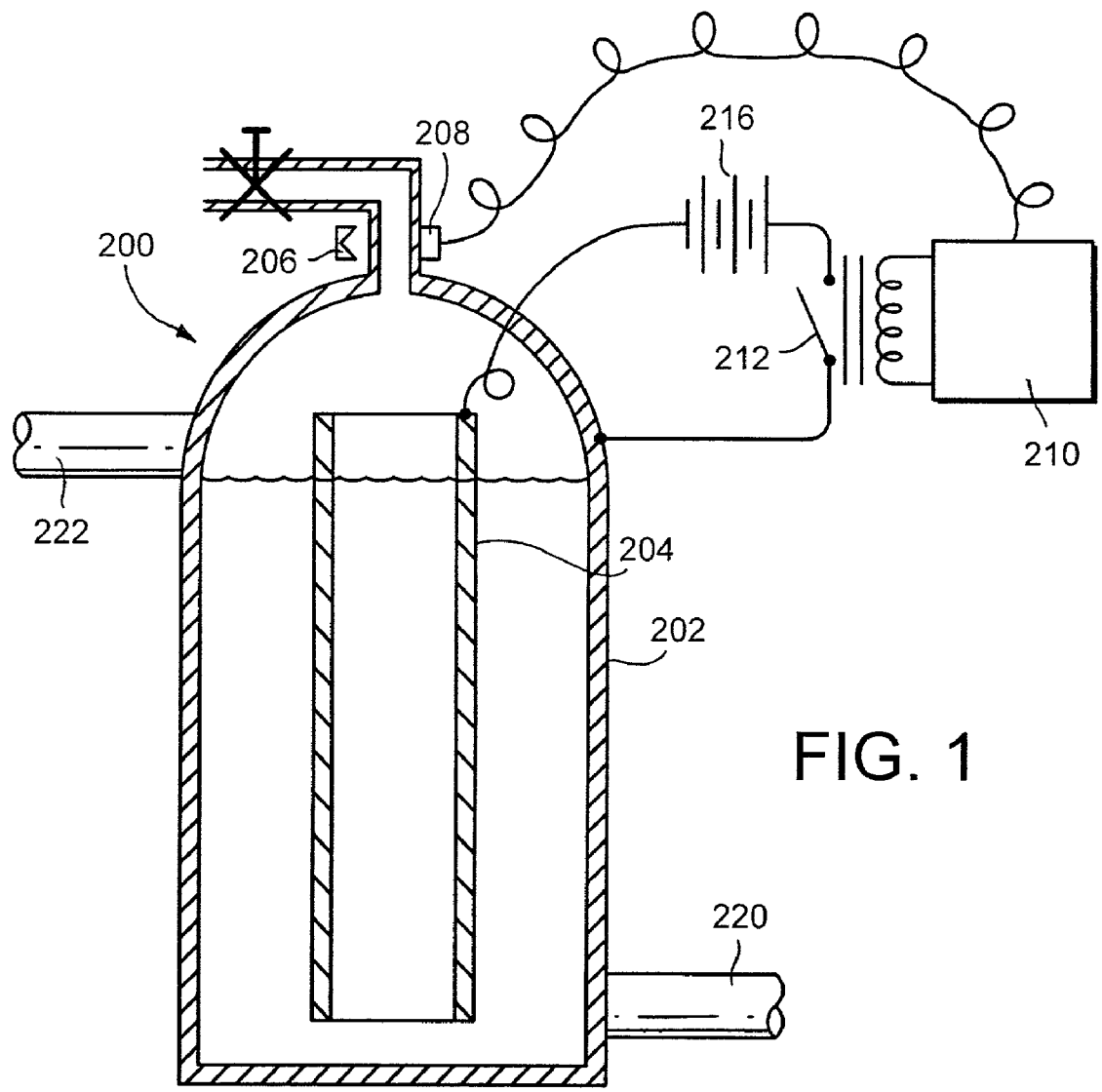
FIG. 1 is a schematic illustration of the principles of an embodiment of the invention.

FIG. 1 shows an embodiment 200 in which suitable electrodes such as concentric electrodes 202 and 204 receive intermittently applied voltage to influence the solvated organic waste between the electrodes to produce hydrogen when desired. In operation, voltage is applied by voltage source 216 according to a duty cycle controlled by relay 212 that is adaptively adjusted by controller 210 to facilitate hydrogen generation and to prevent substantial methane production.

Feedback information from gas detector 206/208 is provided to controller 210. If trace amounts of methane are detected a voltage is applied between electrodes 202 and 204 for a recorded time period until methane production is depressed. The time until methane traces are detected again is noted by controller 210 and a duty cycle of applying voltage across electrodes 202 and 204 for a time interval slightly longer than the time noted for depressing methane production followed by neutral electrode operation for a time period slightly less than the time noted previously for traces of methane to be detected.

This duty cycle is adaptively changed to shorten the time of voltage application and to extend the time between voltage application for purposes of minimizing methane production while maximizing hydrogen production with least application of voltage to electrodes 202 and 204. Voltage level is reduced to provide another variable and adaptively adjusted with respect to the time of voltage application to minimize energy expenditure. This adaptive control algorithm rapidly adjusts for changes in organic waste composition, moisture content, temperature, pressure, and other variables.

Figure 2:
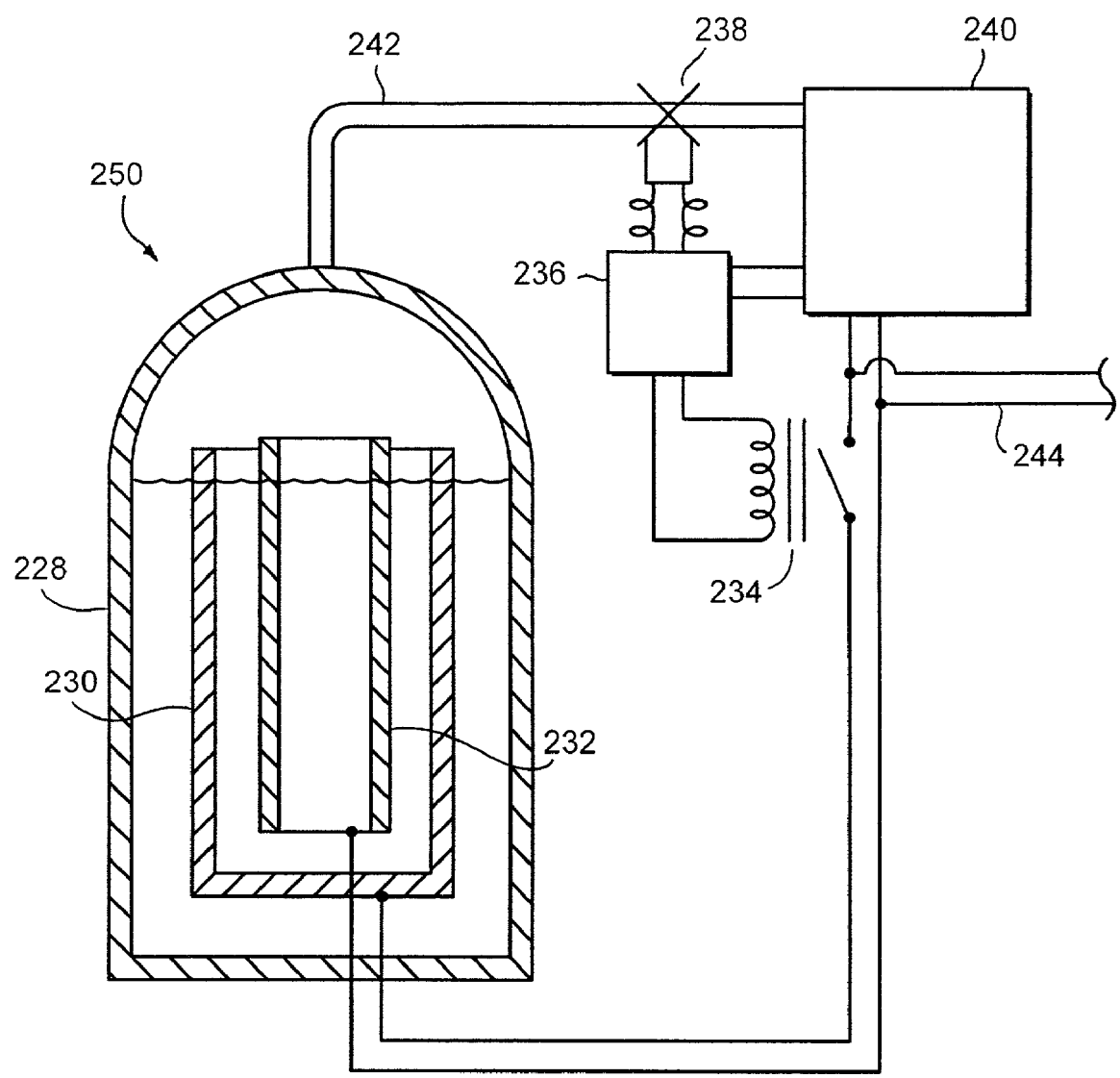
FIG. 2 is a schematic illustration showing a process embodiment.

FIG. 2 shows an embodiment in which the fuel gas produced by the process of the invention in the presence of electrodes 230 and 232 is in part made available for energy conversion in 240 to electricity by a fuel cell and/or engine-generator set preferably as set out in my copending U.S. patent application Ser. No. 09/128,673. Adaptively controlled application of voltage to electrodes 230 and 232 is provided by controller 236 and relay 234 as shown for purposes of minimizing energy consumption per therm of hydrogen produced.

Moreover, adaptive controller 236 can be programmed to provide a control algorithm to minimize methane production while facilitating maximum hydrogen production. Solenoid operated valve 238 controls delivery of fuel gas by line 242 to energy conversion unit 240 as needed to meet adaptively adjusted duty cycle and to meet other demands for electricity as delivered by insulated cables 244. Suitable power for pumping water, providing a heat-pump cycle, or production of electricity at 240 may be by a heat engine and generator, a fuel cell, a thermoelectric generator, or other devices that convert fuel potential energy into electricity.

Illustratively a home or community can collect sewage, garbage, and garden wastes in an anaerobic digester for production of methane or hydrogen. If methane is collected it can be dissociated to provide carbon and hydrogen. When used in an engine or fuel cell each kilogram of hydrogen produces nine kilograms of pure water. A hydrogen powered engine can drive an alternator to produce electricity, the steam in the engine's exhaust can be utilized to transfer heat to cook food, dry crops or clothes, and provide space heating along with pure water upon condensation. The overall energy utilization efficiency can usually double that of an average central power plant.

Further efficiency improvements are provided by production of hydrogen from methane that is present. Hydrogen characterized fuel combustion provides thermodynamic advantages based on faster fuel combustion, wider air/fuel ratio combustion limits, and with SmartPlug operation the engine operates essentially without throttle losses. These thermodynamic advantages provide much higher brake mean effective pressure or "BMEP" for the same heat release in comparisons with homogeneous charge gasoline or natural gas.

As shown in Table 1, it is possible to actually clean the air with an engine generator running on hydrogen or hydrogen-characterized fuel produced from landfill or sewage organic wastes. The ambient air was cleaned by operation of an engine using hydrogen. This shown in the comparison of operation between hydrogen and gasoline in Table 1. As shown, ambient air containing hydrocarbon contamination was substantially cleaned by the engine using hydrogen.

TABLE 1

TEST RESULTS

| | AMBIENT AIR TEST: | | |
|---|---|---|---|
| | 29 ppm HC (hydrocarbons) | 0.00 ppm CO (Carbon Monoxide) | 1.0 ppm NO (Nitrogen Monoxide) |
| | ENGINE WITH HYDROGEN OPERATION: | | |
| Idle: | 18 ppm HC | 0.00 ppm CO | 1.0 ppm NO |
| Full Power: | 6 ppm HC | 0.00 ppm CO | 2.0 ppm NO |

TABLE 1-continued

TEST RESULTS

USING GASOLINE AS FUEL IN THE SAME ENGINE:

| | | | |
|---|---|---|---|
| Idle: | 190 ppm HC | 25,000 ppm CO | 390 ppm NO |
| Full Power: | 196 ppm HC | 7,000 ppm CO | 95 ppm NO |

Substantial amounts of carbon dioxide are produced along with methane by operation of anaerobic digestion of organic wastes. In pyrolysis as summarized in Equation 1 it is common for considerable carbon monoxide to be produced as water and air that may be present yield oxygen to form carbon monoxide and/or carbon dioxide. As these oxygen donors are depleted, the process shifts to the production of carbon and hydrogen as shown in Equation 1.

Economical separation of methane and/or hydrogen from the carbon monoxide and/or carbon dioxide is needed for compliance with pipeline transport specifications, transportation and fuel cell applications, for increasing the storage density of gaseous fuels, for facilitating sequestration of carbon from methane, and for increasing the market value of fuels produced. Such separation is provided by the embodiment of FIG. 3. This embodiment also serves the purpose of providing for utilization of the carbon monoxide and/or carbon dioxide for various purposes including use in greenhouses or hydroponics and is an important aspect of the invention.

Separation of fluid fuel from organic material is achieved by an anaerobic reaction zone with controlled conditions of operation including temperature, acidity, and pressure to support decomposition by microorganismal activity at warm temperatures, thermochemical dissociation at elevated temperatures, and photosynthetic metabolism processes producing directly or indirectly fuel constituents such as methane and hydrogen along with carbon compounds such as carbon dioxide. When elevated temperature dissociation, partial oxidation or steam reforming is present, carbon monoxide may be produced.

The solubility of carbon compounds such as carbon dioxide in water is about 21.6 volumes of gas per volume of water at 25 atmospheres pressure and 12° C. (54° F.). Increasing the pressure or decreasing the temperature increases the amount of carbon dioxide dissolved per volume of water. Lowering the pressure or increasing the temperature releases dissolved carbon dioxide. In most areas of the Earth, the ground water is maintained at a temperature that is equal to the mean annual air temperature plus one degree (F) for each 80' of overburden to the saturated zone.

Figure 3:
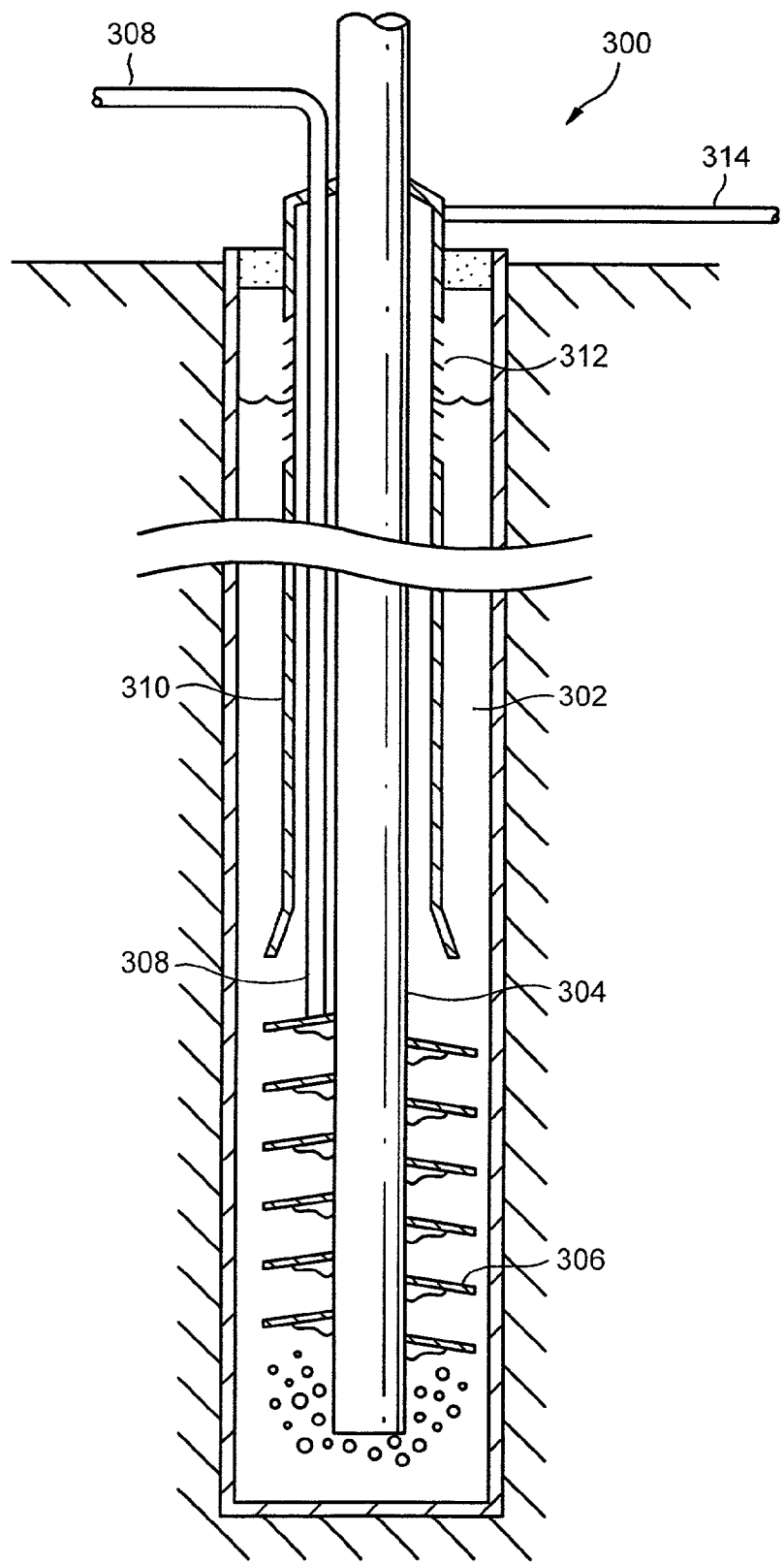
FIG. 3 is a schematic illustration of the principles of another embodiment of the invention.

FIG. 3 shows a system for separating carbon dioxide from hydrogen by differential absorption of carbon compounds such as carbon dioxide within a suitable medium such as water or a hindered amine. In illustrative operation, mixed gases from various anaerobic sources such as microorganismal digestion, pyrolysis, and electrolysis consisting of hydrogen and/or methane, carbon dioxide, carbon monoxide and lesser amounts of nitrogen, and other gases are forced into the bottom of a column of water 302 approximately 1,000' or higher.

In many geological settings it is preferred to use a column of water that is developed by placing a well approximately 1000' below the saturated zone of the local groundwater. This provides the extremely large heat sink benefit of the sub soil including the ground water in the saturated zone where the temperature is generally constant at the desired temperature of 4° C. to 16° C. (40° F. to 60° F.) for most climate zones throughout the year. This provides for protection against freezing and unwanted warming.

Water columns that are elevated along mountain slopes are also feasible but may require provisions such as occasional drain down to prevent damage due to freezing conditions in the winter and shading or evaporative cooling to reduce unfavorable warming in the summer season.

Mixed gases are delivered to the bottom of tube 304 by a suitable pump (not shown). Mixed gases enter into a suitable scrubber zone such as the helical fin 306 that is attached to tube 304 with a higher elevation at the point of attachment than any other point on the element of rotation that describes the helical surface as shown. Gases thus tend to be buoyed towards tube 304 as they are scrubbed by the absorbing fluid. Carbon compounds such as carbon monoxide and carbon dioxide readily enter into solution at the pressure and temperature conditions maintained. Hydrogen and/or methane exits at the top of the helix into tube 308 at the pressure of the fluid head above the collection point and is delivered to the surface for various uses. Hydrogen may be separated from methane by microspheres in a temperature swing separator or by pressure swing adsorption systems.

Carbon compounds in solution such as carbon-monoxide or carbon-dioxide rich water is ducted to the surface by coaxial tube 310 as shown. As the head pressure lessens, carbon compounds such as dioxide bubbles develop and escape upward and create a lower density mixture that is buoyantly lifted to the gas separator section 312 where denser water that has lost the ability to retain carbon dioxide is returned to annular space 302 and sinks the bottom to replace the upward traveling inventory of water that is lifted within tube 310.

Carbon dioxide is collected at the top of 310 by tube 314 for various useful purposes including improvement of greenhouse atmospheres, feeding of algae and other photosynthesis based growth in ponds, and as a reactant in further energy conversion applications. Carbon particles are collected by suitable filters, hydrocyclones, or settlement ponds. This type of carbon has been found to particularly useful as a feedstock for making activated carbon filter media.

In the instance of separating and collecting carbon monoxide it generally preferred to utilize this valuable compound as a fuel in an engine or fuel cell or to utilize it in chemical reactions to produce methanol and other compounds, or to utilize the carbon monoxide in an energy transport system based upon reactions similar to that of Equation 4.

Methane separated and collected accordingly can be decomposed to produce carbon in various useful forms and hydrogen. Equation 1 illustrates.

$$CH_4 + HEAT \rightarrow C + 2H_2 \qquad \text{Equation 1}$$

Hydrocarbons in general are similarly dissociated into carbon and hydrogen. It is especially beneficial to the environment to sequester carbon by this process because carbon dioxide releases typical to steam reforming and partial oxidation are avoided. Heat for the process can be supplied by any source including renewable and non-renewable energy sources.

In many areas it is preferred to supply the heat needed by concentration of solar energy using parabolic point focus or line focus collectors to provide the elevated temperatures needed for dissociation as shown in Equation 1.

In instances that wind, wave, or hydro electricity is more cost effective, the carbon is preferably precipitated by electric induction heating of crystalline carbon. Continuous depositing of crystalline carbon is accomplished by providing the heat of formation to the seed crystal. Recovery of precipitated crystalline carbon is accomplished according to my co-pending U.S. C.I.P of patent application Ser. No. 08/921,134 and U.S. application Ser. No. 09/370,431 which are incorporated herein and made part of this patent application.

Water is dissociated by concentrated solar energy and/or by electrolysis according to the reaction of Equation 2:

$$H_2O + Energy \rightarrow H_2 + 0.5O_2 \qquad \text{Equation 2}$$

Such hydrogen can be reacted with carbon from coal, peat, oil shale, or other carbon donors to produce methane which can be transported in pipelines and stored in depleted natural gas and/or oil formations along with pressurized or liquified storage systems. Producing and delivering renewable hydrogen can thus be accomplished by first reacting such hydrogen with a carbon donor from sources including coal, organic wastes, carbon dioxide, and carbon monoxide, or peat to form methane, transporting said methane to virtually any site in a pipeline selected from the group including newly constructed pipe, existing natural gas pipelines, and multifuel pipelines, dissociating said methane to deliver hydrogen and carbon.

Collection of relatively pure carbon dioxide enables shifting to carbon monoxide by similar high temperature dissociation and/or by electrolysis, especially in electrolytic solution.

$$CO_2 + Energy \rightarrow CO + 0.5O_2 \qquad \text{Equation 3}$$

Hydrogen can be reacted with carbon monoxide and water vapor at about 400° C. to produce methane for convenient shipment in conventional natural gas pipelines.

$$H_2 + CO + H_2O \rightarrow CO_2 + CH_4 \qquad \text{Equation 4}$$

Carbon dioxide can be collected in liquids such as fused salts or hindered amines and electrolyzed to release oxygen and carbon monoxide or carbon.

The process reactions typical to Equations 1–4 can be expedited by suitable catalysts known to those that are proficient in catalyst engineering and technology. Methane produced by the reaction of Equation 4 can be stored in depleted natural gas and oil reservoirs. At locations that distributed energy is needed, such methane is delivered by natural gas pipelines and dissociated into carbon to produce durable goods and hydrogen according to the overall reaction of Equation 1. Hydrogen is used in a fuel cell or heat engine to produce the energy needed without pollution.

In anaerobic digestion as in the systems of FIGS. 1 and/or 2, acidity or pH is generally maintained by a natural bicarbonate buffer interaction. The bicarbonate buffer is supplied by continuous production of carbon dioxide in the digestion process. The process is generalized for anaerobic digestion of organic wastes compounds by illustrative digestion of a simple carbohydrate or glucose:

$$C_6H_{12}O_6 + \text{(Anaerobic Acid formers, Facultative bacteria)} \rightarrow 3CH_3COOH \qquad \text{Equation 5}$$

$$3CH_3COOH + 3NH_4HC_6O_3 \rightarrow 3CH_3COONH_4 + 3H_2O + 3CO_2 \qquad \text{Equation 6}$$

$$3CH_3COONH_4 + 3H_2O \text{ (Methane Bacteria)} \rightarrow 3CH_4 + 3NH_4HCO_3 \qquad \text{Equation 7}$$

In instances that optimized conditions for methane are desired, pH control near 7 is needed. At ambient pressure, pH of about 7.0, and 35–37° C. (99° F.), methanogenesis is favored. Most domestic waste water contains biowastes with both macro and micronutrients required by the organisms that provide methanogenesis.

The normal operations of methane-forming microorganisms can be inhibited by maintaining relatively large concentrations of hydrogen and or sugar present in the anaerobic reactor. Another way to inhibit methanogenesis us by electrolysis of acetic acid ($CH_3COOH$) produced by bacterial breakdown of glucose and other organic compounds and by other acid production processes that yield hydrogen ions.

$$CH_3COOH \rightarrow CH_3COO^- + H^+ \qquad \text{Equation 8}$$

Hydrogen ions migrate or are delivered to the negatively charged electrode and gain electrons to produce hydrogen gas.

$$2H^+ + 2e \rightarrow H_2 \qquad \text{Equation 9}$$

Two electrons are supplied by the negatively charged electrode. At the other electrode the main electrochemical reaction is the oxidation of the acetate ion to carbon dioxide and hydrogen ions as summarized in Equation 10.

$$CH_3COO^- + 2H_2O \rightarrow 2CO_2 + 7H^+ + e \qquad \text{Equation 10}$$

In this electrode reaction, the acetate ion loses an electron, reacts with the water and breaks up into carbon dioxide gas and hydrogen ions. Carbon dioxide saturates the solution and then is released to be collected above the liquid solution surface. Hydrogen ions are circulated until reaction to produce hydrogen as shown in Equation 9.

Decomposition by anaerobic digestion of compounds such as acetic acid to produce hydrogen and carbon dioxide requires much less energy than electrolysis of water. This is because the digestion reactions yield exothermic energy. Initialization and maintenance of the exothermic decomposition of acids such as acetic acid may be accomplished by intermittent electrolysis instead of continuous electrolysis as required to decompose water.

This is because the free energy of formation of water is quite large (at least 1 KWH= 3,412 BTU of released hydrogen) compared to the electrolysis of acetic acid to hydrogen and carbon dioxide which requires relatively minimal activation and/or free energy input.

After undergoing heating and expansion to a suitably low pressure, carbon dioxide is collected by tube 458 and taken to a suitable application. Water is condensed and collected in reservoir 450 which is cooled by countercurrent heat exchanger 456 by circulation of a suitable heat exchange fluid from 446 to 456 and then through 448 to a suitable cogeneration application. Cooled water is pressurized by pump 454 and returned to pressure vessel 402 to complete the novel carbon dioxide removal and energy conversion cycle.

Figure 4:
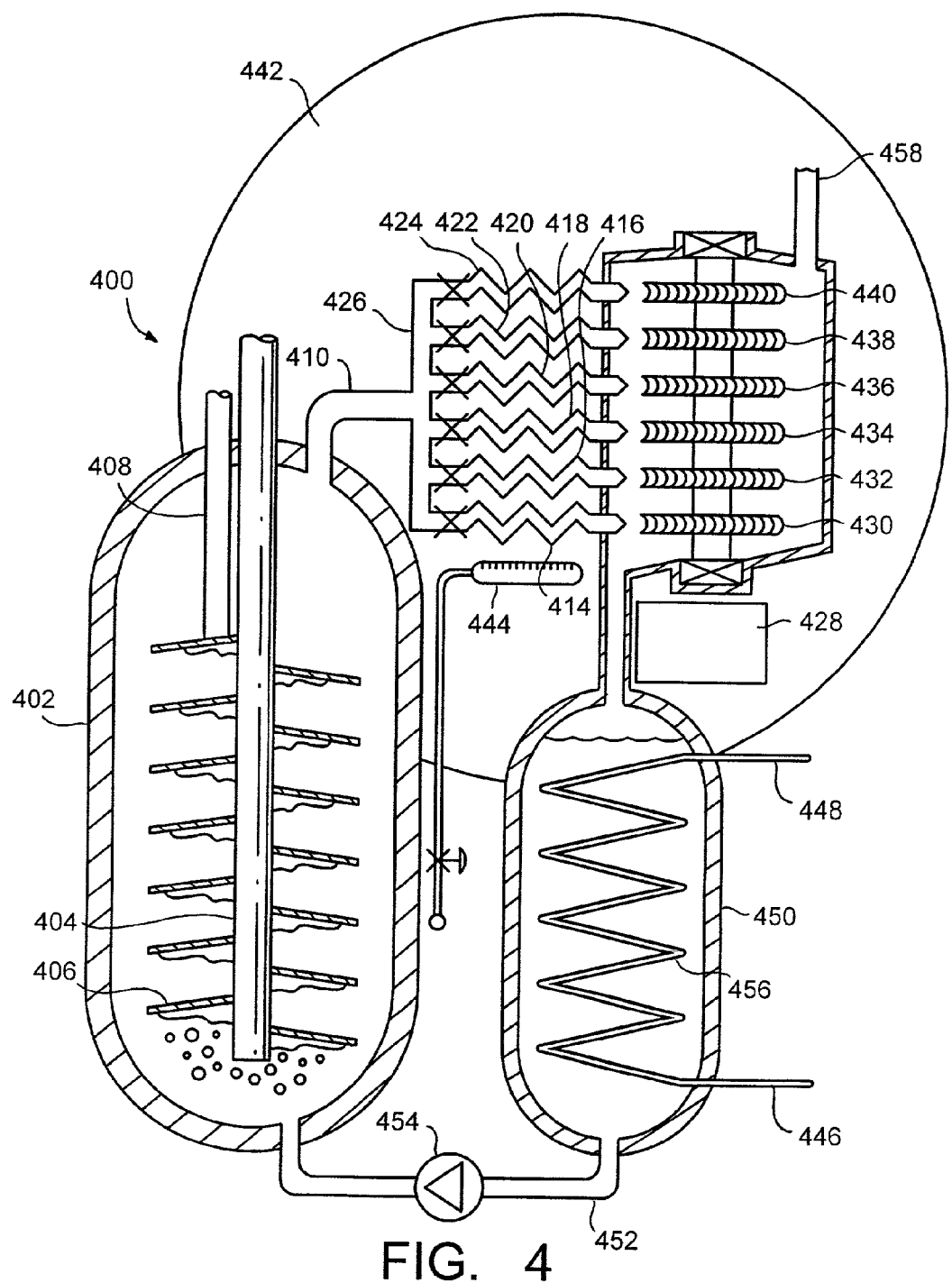
FIG. 4 is a schematic illustration of the principles of another embodiment of the invention.

FIG. 4 shows an embodiment in which energy used to pressurize the hydrogen and carbon dioxide is regeneratively recovered by an expansion engine. Embodiment 400 shows an extremely rugged and simple energy conversion system that combines various renewable resources such as sewage, garbage, and farm wastes with solar energy to supply electricity, hydrogen, carbon monoxide and/or carbon dioxide.

In many situations and applications it is preferred to pressurize water in a suitable vessel 402 to provide for the separation by solubility differences as desired to purify a fuel such as hydrogen or methane. In Illustrative operation, mixtures of hydrogen and carbon dioxide are forced through tube 404 into pressure vessel 402 at the nominal pressure of 450 PSI. It is preferred to utilize a spiral mixer consisting of a helical fin 406 that causes the mixture of gases to scrub along the surface and form high surface-to-volume ratios. The mixed gases follow an extended path through the water as carbon dioxide is absorbed to allow the hydrogen to be collected at the top of spiral scrubber 406 by tube 408 as shown. Carbon dioxide is absorbed into the water while hydrogen is collected at the top of separator 406 as shown.

Hydrogen is delivered by conduit 408 at the pressure of vessel 402 for immediate use in an engine or fuel cell or it may be stored for future use as needed. Carbon dioxide saturated water is taken from absorber vessel 402 by tube 410 to valve manifold 426 which provides control valves to time the flow of carbon dioxide rich water into each of a group of heat exchangers such as 414, 416, 418, 420, 422, and 424 as shown. Each heat exchanger is provided with an exit a nozzle that is aimed at the blades or buckets of an adjacent fluid motor rotor such as 430, 432, 434, 436, 438, and 440 which deliver work to a common output shaft as shown.

An inventory of water and carbon dioxide solution under pressure is suddenly forced into a preheated heat exchanger such as 414 by briefly opening the control valve that serves 414. As the fluid is heated the temperature and pressure of the fluid increases and it vaporizes and is expelled with very high momentum to power motor 430. Each of the other heat exchanger chambers receives a charge of fluid on a timed basis so that the shaft power from the group of motors shown can be considered to have multiple phase torquing such as six phase if each heat exchanger receives flow at a different times or three phase if two heat exchangers are filled simultaneously. A suitable application of the output of the fluid motor is generator 428 or other useful loads as needed.

It is preferred to provide concentrated radiation to the heat exchangers by a suitable solar collector such as a field of heliostats or a parabolic dish 442 as shown. At times that solar energy is insufficient to meet energy conversion needs, supplemental heat may be applied by combustion from a suitable burner 444. For such supplemental heating it is preferred to use mixtures of carbon dioxide and hydrogen and/or other combustible gases released by anaerobic digestion of organic matter.

In the instance that carbon monoxide is the main carbon compound separated from hydrogen and/or methane in vessel 402 it is preferred to utilize such carbon monoxide delivered by tube 458 to a heat engine or fuel cell. This cascade of thermodynamic benefit greatly improves overall efficiency.

SUMMARY OF THE INVENTION

Method and apparatus for utilization of compounds containing carbon and hydrogen from landfill, sewage, and agricultural wastes, along with other organics are provided. Regenerative separation of carbon monoxide, carbon dioxide, and carbon solids from such organics and favorable carbon sequestration is provided. Carbon compounds and fuel constituents are separated by processes that provide preferential absorption of carbon monoxide and/or carbon dioxide, mixing the fuel constituents and carbon compounds with the separation medium, and collecting the fuel provided by preferential absorption of carbon compounds.

Energy conversion efficiency is increased by adding heat to the fluid after preferential absorption of carbon compounds for the purpose of increasing the amount of work produced by a motor that expands the pressurized fluid, releasing the carbon compounds in conjunction with the expanding process, and cooling the fluid before the pressurizing step. The preferred source of such heat is selected from the group including solar energy, heat released by combustion of a portion of the fuel produced, concentrated solar energy, from a heat engine, and a combination of solar energy along with heat produced by combustion of a portion of the fuel constituents.

An energy conversion process is provided by the steps of anaerobically dissociating and/or digesting organic materials to produce carbon dioxide and fuel selected from the group including hydrogen, methane, and mixtures of hydrogen and methane, and separating the carbon compounds such as carbon monoxide and/or carbon dioxide from the fuel values.

Methods of separation include microsphere diffusion separation, pressure swing and/or temperature swing adsorption. This may be illustrated by pressurizing a fluid to a state that provides preferential absorption of carbon dioxide, mixing the carbon dioxide and fuel with the fluid, collecting the fuel that remains after said preferential absorption of carbon dioxide, adding heat to the fluid after preferential absorption of carbon dioxide for the purpose of increasing the amount of work produced by a motor that expands pressurized fluid, releasing carbon dioxide in conjunction with the expanding process, and cooling the fluid before the pressurizing step.

In instances that it is preferred to utilize anaerobic digestion to produce hydrogen instead of methane, organic feedstock materials are placed in a reaction zone and an electric potential or voltage is applied across the materials thereby producing hydrogen and carbon dioxide. It is preferred to provide application of adaptively intermittent energy expenditure for purposes selected from the group including depression of microorganismal activity that produces methane, enhancement of microorganismal activity that produces hydrogen, and creation of an atmosphere within organic materials that is maintained rich in hydrogen.

Adaptive intermittent application of voltage is optimized by feedback information from a gas detector as provided to a controller means. If trace amounts of methane are detected, or conversely if the concentration of hydrogen falls below a desired value, the voltage is applied for a recorded time period until methane production is depressed, the time until methane traces are detected again is noted by the controller and a duty cycle is provided for applying voltage for a time interval slightly longer than the time noted for depressing methane production and/or which is followed by neutral electrode operation for a time period slightly less than the time noted previously for traces of methane to be detected.

In this process of proportioning the on-time of voltage application, the voltage level is variably reduced to provide an adaptively adjusted control with respect to the time of said voltage application to minimize energy expenditure.

Another embodiment for control of methane production provides recirculation of produced hydrogen to assure a hydrogen rich environment in which methane synthesis is depressed.

It thus will be understood that the objects of this invention have been fully and effectively accomplished. It will be realized, however that the foregoing preferred specific embodiments have been shown and described for the purpose of illustrating the functional and structural principles of this invention.

These preferred descriptions are subject to change without departure from such principles. Therefore, my invention includes all modifications encompassed within the spirit, scope, and legal equivalences of the following claims.

What is claimed is:

1. A process for separating fluid fuel constituents from organic material comprising the steps of: placing said material in an anaerobic reaction zone; and controlling the conditions of operation selected from the group comprising temperature, acidity, and pressure to support processes selected from the group including decomposition by microorganismal activity, thermochemical dissociation, chemical synthesis, and photosynthetic chemistry thereby producing said fuel constituents selected from the group including methane, hydrogen, and mixtures of methane and hydrogen along with one or more carbon substances selected from the group including carbon dioxide, carbon monoxide, carbon, and mixtures of carbon monoxide and carbon dioxide, and separating one or more of said carbon substances from one or more of said fuel constituents by a separation means selected from the group including selective removal of one or more of said carbon substances, selective removal of one or more of said fuel constituents by a medium that is controlled by a process selected from the group including pressure swing absorption, temperature swing absorption, and pressure and temperature swing absorption wherein said separation means provides the steps of:

mixing said fuel constituents and said carbon substances with said medium, controlling said medium to provide preferential absorption of selections from either said carbon substances or said fuel constituents, collecting selections of said fuel constituents or said carbon substances that remain after said preferential absorption.

2. A process as in claim 1 in which said separation means provides absorption of said carbon substance in a pressurized fluid that allows passage of said fuel to a collection means.

3. A process as in claim 1 in which said separation means includes a head of fluid that produces preferential absorption of one or more of said carbon substances.

4. A process as in claim 1 in which said separation means includes a head of fluid and said fluid is maintained within a desirable range of operating temperatures by subsoil conditions.

5. A process as in claim 1 in which said medium is selected from the group including microspheres, water, and amines.

6. A process for separating fluid fuel constituents from organic material and providing energy conversion comprising the steps of: placing said material in an anaerobic reaction zone; and controlling the conditions of operation selected from the group comprising temperature, acidity, and pressure to support processes selected from the group including decomposition by microorganismal activity, thermochemical dissociation, chemical synthesis, and photosynthetic chemistry thereby producing said fuel constituents along with one or more carbon substances selected from the group including carbon dioxide, carbon monoxide, carbon, and mixtures of carbon monoxide and carbon dioxide, and separating one or more of said carbon substances from one or more of said fuel constituents by a separation process selected from the group including selective removal of one or more of said carbon substances, selective removal of one or more of said fuel constituents, and performing said energy conversion by process selected from the group including expansion of one or more of said fuel constituents, expansion of one or more of said carbon substances, addition of heat after said preferential absorption of selections of said carbon substances or of said fuel constituents, addition of heat to one or more of said fuel constituents, and addition of heat to one or more of said carbon substances for the purpose of said energy conversion.

7. A process as in claim 1 or in claim 6 in which heat for said processes requiring heat is selected from the group including solar energy, heat released by combustion, combustion of a portion of said fuel constituents, concentrated solar energy, combination of solar energy along with heat produced by combustion, heat produced by electricity, and heat received from a heat engine.

8. A process as in claim 6 in which said expansion is performed by selected means from the group including an expansion turbine, a positive expansion motor, a phased expansion motor, and an expansion engine.

9. A process as in claim 1 or in claim 6 in which said controlled conditions of operation are modified by catalytic activity.

10. A process for conversion of biomass substances into useful fuel constituents comprising the steps of: application of intermittent voltage for process optimization purposes selected from the group including depression of microorganismal activity that produces methane, enhancement of microorganismal activity that produces hydrogen, and creation of an atmosphere within said biomass wastes that is maintained rich in hydrogen wherein said process employs intermittent voltage according to an adaptive algorithm that provides adjustment of operating parameters selected from the group including adjustment of voltage magnitude, times of said voltage application, intervals between times of voltage application, and duration of voltage application for purposes selected from the group including depression of microorganismal activity that produces methane, enhancement of microorganismal activity that produces hydrogen, and creation of an atmosphere within said biomass that is maintained rich in hydrogen and wherein feedback from a gas detector is provided to a controller means that utilizes said algorithm.

11. The process of claim 10 in which said voltage is generated by utilization of one or more of said fuel constituents by means selected from the group including: a fuel cell, an engine, a combination of a fuel cell and an engine, and a thermoelectric generator.

12. The process of claim 10 in which feedback information from a gas detector means is provided to a controller means that utilizes an algorithm that includes the time until methane production is depressed by adaptive application of said voltage.

13. The process of claim 10 in which feedback information from a gas detector means is provided to a controller means that utilizes an algorithm that includes the time until methane production is detected between adaptive applications of said voltage.

14. The process of claim 10 in which said voltage magnitude and or time of application or time between voltage applications is adaptively adjusted to minimize energy expenditure.

* * * * *